(12) United States Patent
Kwok et al.

(10) Patent No.: US 7,306,249 B2
(45) Date of Patent: Dec. 11, 2007

(54) FOLDING COLLAPSIBLE BICYCLE

(76) Inventors: Wang-On Kwok, 251 Yuen Kong San Tsuen, Kam Sheung Road, Pat Heung, Yuen Long, N T. (HK); Pui Yee Noel Lo, 251 Yuen Kong San Tsuen, Kam Sheung Road, Pat Heung, Yuen Long, N T. (HK)

( * ) Notice: Subject to any disclaimer, the term of this patent is extended or adjusted under 35 U.S.C. 154(b) by 276 days.

(21) Appl. No.: 11/223,995

(22) Filed: Sep. 13, 2005

(65) Prior Publication Data
US 2007/0063478 A1 Mar. 22, 2007

(51) Int. Cl.
*B62K 15/00* (2006.01)
(52) U.S. Cl. ........................................ 280/278; 280/287
(58) Field of Classification Search ................ 280/278, 280/287
See application file for complete search history.

(56) References Cited

U.S. PATENT DOCUMENTS

| 7,198,281 B2 * | 4/2007 | Huang ......................... 280/278 |
| 2006/0097476 A1* | 5/2006 | Kobayashi .................. 280/287 |
| 2007/0069499 A1* | 3/2007 | Lin ............................. 280/287 |

* cited by examiner

*Primary Examiner*—Kevin Hurley
(74) *Attorney, Agent, or Firm*—Rosenberg, Klein & Lee

(57) ABSTRACT

A folding collapsible bicycle, which includes a front connecting bar pivoted to the bicycle frame and locked by a lock to hold a front fork, a retractable fork tube hinged to the front fork and locked thereto with a lock screw to hold two collapsible handlebars, and a seat pillar holder pivoted to the bicycle frame at the top and locked thereto with a lock to support a seat pillar and a saddle on the seat pillar.

7 Claims, 17 Drawing Sheets

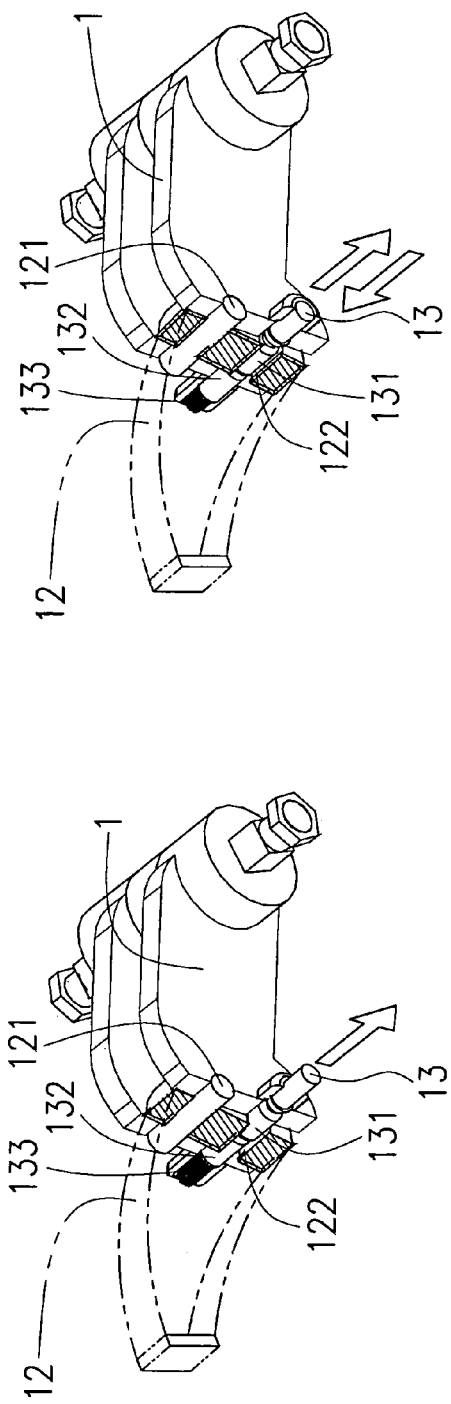
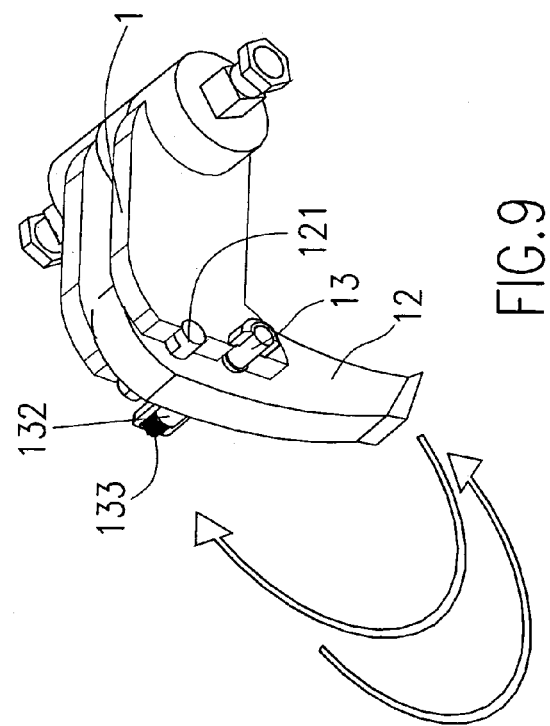
FIG. 7
FIG. 8
FIG. 9

FOLDING COLLAPSIBLE BICYCLE

BACKGROUND OF THE INVENTION

1. Field of the Invention

The present invention relates to bicycles and more particularly, to a folding collapsible bicycle.

2. Description of the Related Art

Conventionally, a bicycle requires a big packing or storage space when not in use. Because of a big size, it is inconvenient to carry a bicycle when traveling. In order to save space occupation, folding bicycles are developed. These commercial folding bicycles can be folded up to reduce the size when not in use. However, these folding bicycles still occupy much space when folded up.

SUMMARY OF THE INVENTION

The present invention has been accomplished under the circumstances in view. It is therefore the main object of the present invention to provide a folding collapsible bicycle that can conveniently be folded up and received in a collapsed condition to reduce space occupation. It is another object of the present invention to provide a folding collapsible bicycle, which allows quick connection of multiple folding collapsible bicycles to form a tandem or combination bicycle for two or more riders. It is still another object of the present invention to provide a folding collapsible bicycle, which is safe in use.

According to one aspect of the present invention, the folding collapsible bicycle comprises a front connecting bar pivoted to the bicycle frame and locked by a lock to hold a front fork, a retractable fork tube hinged to the front fork and locked thereto with a lock screw to hold two collapsible handlebars, and a seat pillar holder pivoted to the bicycle frame at the top and locked thereto with a lock to support a seat pillar and a saddle on the seat pillar.

According to another aspect of the present invention, the front fork has a front mounting hole and the bicycle frame has a rear bracket such that a connecting bar can be connected between the rear bracket of a first folding collapsible bicycle and the mounting hole of the front fork of a second folding collapsible bicycle to connect the two folding collapsible bicycles in series, thereby forming a tandem.

According to still another aspect of the present invention, when two folding collapsible bicycles are connected in series to form a tandem, a brake cable can be connected between the rear brakes of the two folding collapsible bicycles for enabling the rear brakes of the two folding collapsible bicycles to work synchronously.

BRIEF DESCRIPTION OF THE DRAWINGS

FIG. 7 is a schematic drawing showing the operation of the lock structure between the front connecting bar and the bicycle frame according to the present invention (I).

FIG. 8 is a schematic drawing showing the operation of the lock structure between the front connecting bar and the bicycle frame according to the present invention (II).

FIG. 9 is a schematic drawing showing the operation of the lock structure between the front connecting bar and the bicycle frame according to the present invention (III).

DETAILED DESCRIPTION OF THE PREFERRED EMBODIMENT

Figure 1:
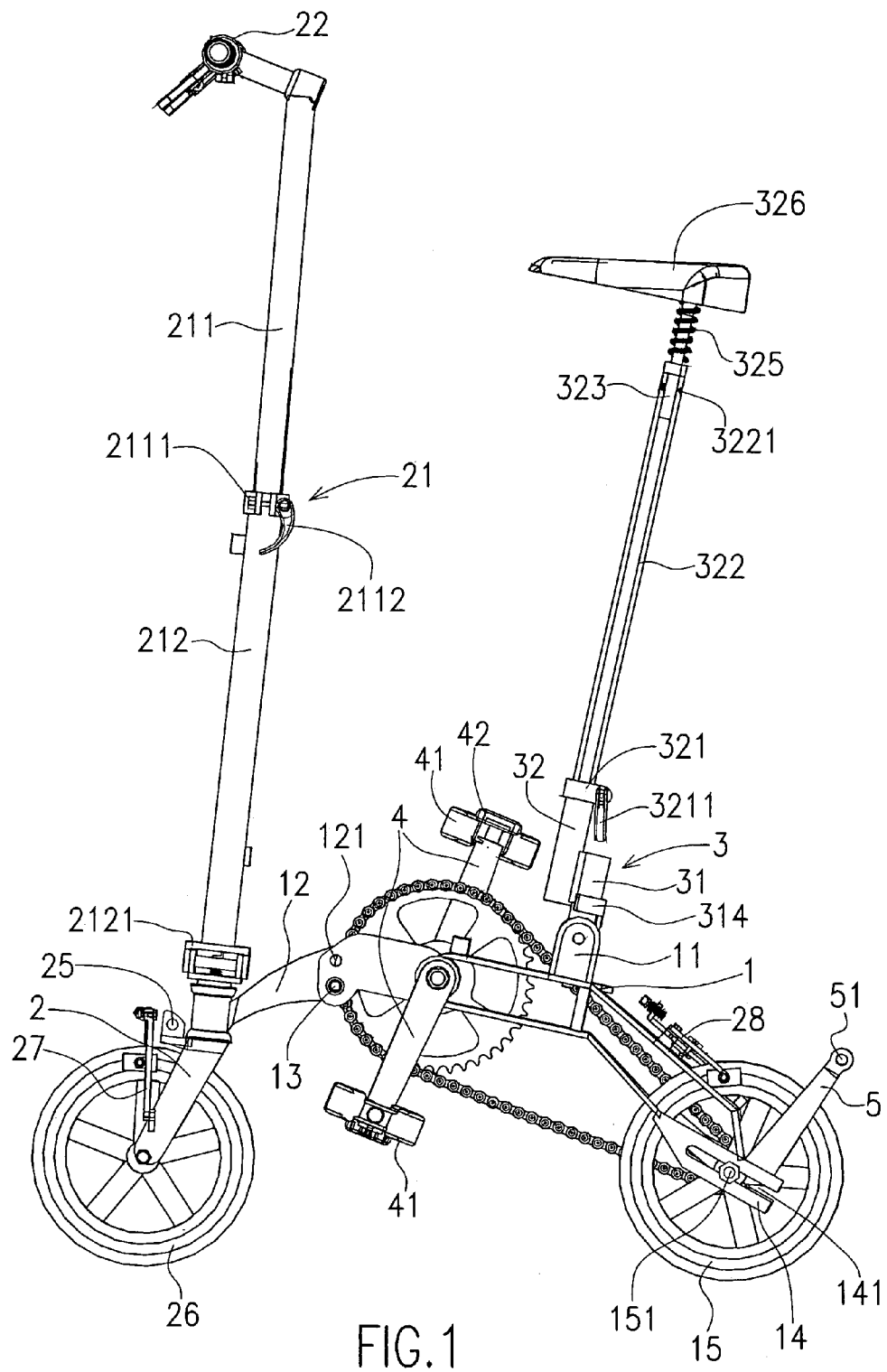
FIG. 1 is a side view of a folding collapsible bicycle according to the present invention.
Figure 2:
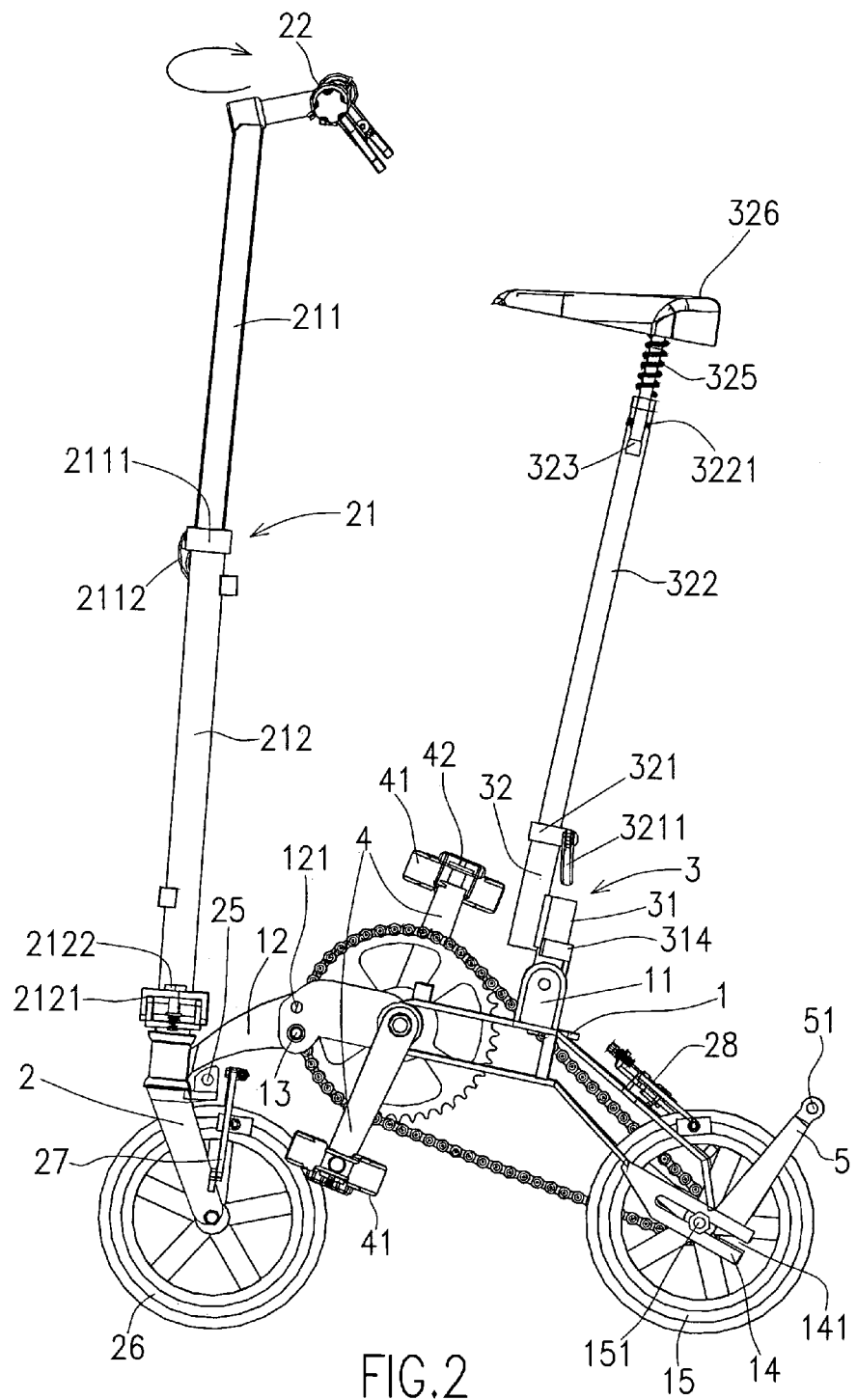
FIG. 2 is a schematic side view of the present invention, showing the handlebars and front fork turned backwards through 180-degrees.

Referring to FIGS. 1 and 2, a folding collapsible bicycle in accordance with the present invention is shown comprised of a bicycle frame 1, a front wheel 26, a rear wheel 15, a front connecting bar 12, a front fork 2, a retractable fork tube 21, two handlebars 23, 24, a seat pillar holder 3, a seat pillar 322, two pedal cranks 4, and two detachable pedals 41.

The front connecting bar 12 has one end coupled to the front fork 2 (i.e., a head tube is formed integral with the front end of the front connecting bar 12 and coupled to the front fork 2) and the other end pivotally connected to the bicycle frame 1 with a pivot 121. A locking structure is provided for locking the front connecting bar 12 to the bicycle frame 1.

As shown in FIGS. 7~9, this locking structure comprises a lock hole 122 on the front connecting bar 12, a spring member 133 mounted on the bicycle frame 1, a lock pin 132 supported on the spring member 133 and forced by the spring member 133 into the lock hole 122 to lock the front connecting bar 12 to the bicycle frame 1, and a push pin 131 mounted on the bicycle frame 1 corresponding to the lock pin 132, and a button 13 for operation by the user to force the push pin 131 against the lock pin 132 and to further disengage the lock pin 132 from the lock hole 122, for allowing the front connecting bar 12 to be turned relative to the bicycle frame 1.

The retractable fork tube 21 comprises a sleeve 212 and an extension tube 211 axially movable in and out of the sleeve 212. The sleeve 212 has the bottom end thereof connected to the front fork 2 by a hinge 2121 and locked by a lock screw 2122. A clamp 2111 is provided at the top end of the sleeve 212, and controllable by a locking lever 2112 to lock the extension tube 211 to the sleeve 212 at the desired elevation. The extension tube 211 has a handlebar stem 22 provided at the top end. The handlebars 23, 24 are respectively hinged to the handlebar stem 22 at two sides and turnable relative to the extension tube 211 between an operative horizontal position (see FIG. 3) and a non-operative vertical position (see FIG. 4). A lock screw 231 is mounted in one handlebar 23. When the handlebars 23, 24 are turned to the operative horizontal position, the lock screw 231 is rotated inwards to thread the threaded shank 232 thereof into a screw hole 241 at one end of the other handlebar 24 and to further lock the handlebars 23, 24.

Referring to FIGS. 11A~11D, the seat pillar holder 3 is mounted on a support 11 at the top side of the bicycle frame 1, comprising a socket 32, which receives the seat pillar 322, and a connecting tube 31 fixedly provided at one side of the socket 32 and pivotally connected to the support 11. A spring member 313 is mounted inside the connecting tube 31, a lock bolt 311 is supported on the spring member 313 and has a bottom tip 312 engaged into a lock hole 16 on the bicycle frame 1 to lock the seat pillar holder 3 to the support 11, a connecting pin 315 transversely connected to the lock bolt 311 and inserted through a longitudinal sliding slot (not shown) on the connecting tube 31, and a handle 314 connected to the connecting pin 315 for pulling by the user to move the lock bolt 311 away from the lock hole 16 and to further unlock the seat pillar holder 3 from the support 11.

Figure 4:
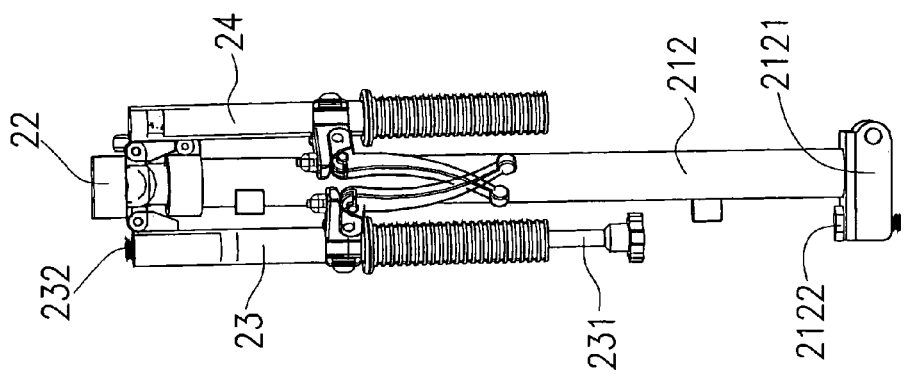
FIG. 4 corresponds to FIG. 3, showing the received status of the handlebars.
Figure 3:
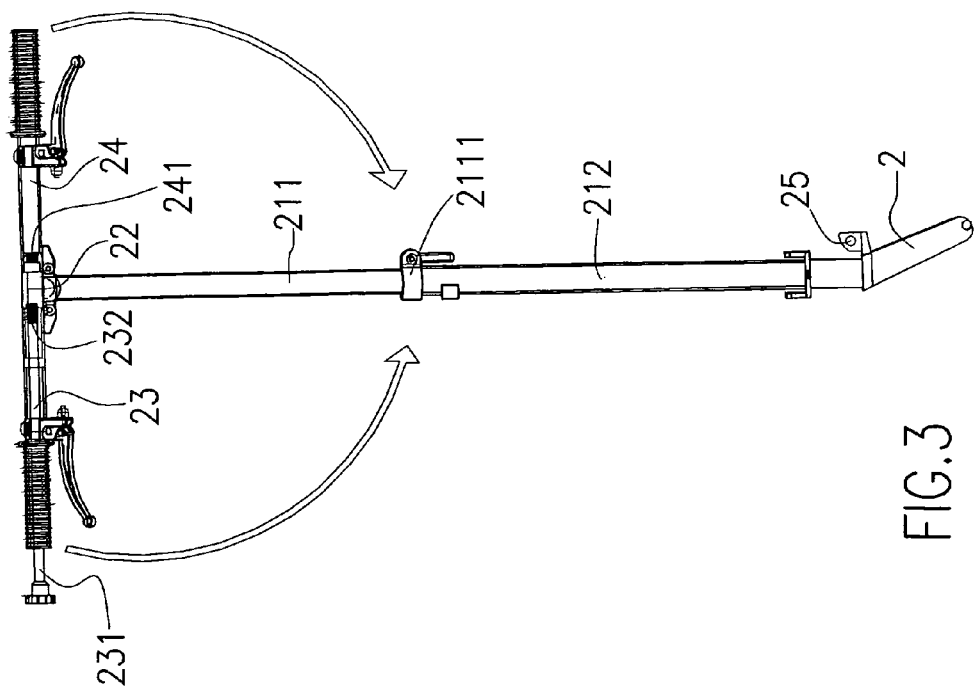
FIG. 3 is a schematic drawing of the present invention, showing the handlebars unlocked.
Figure 5:
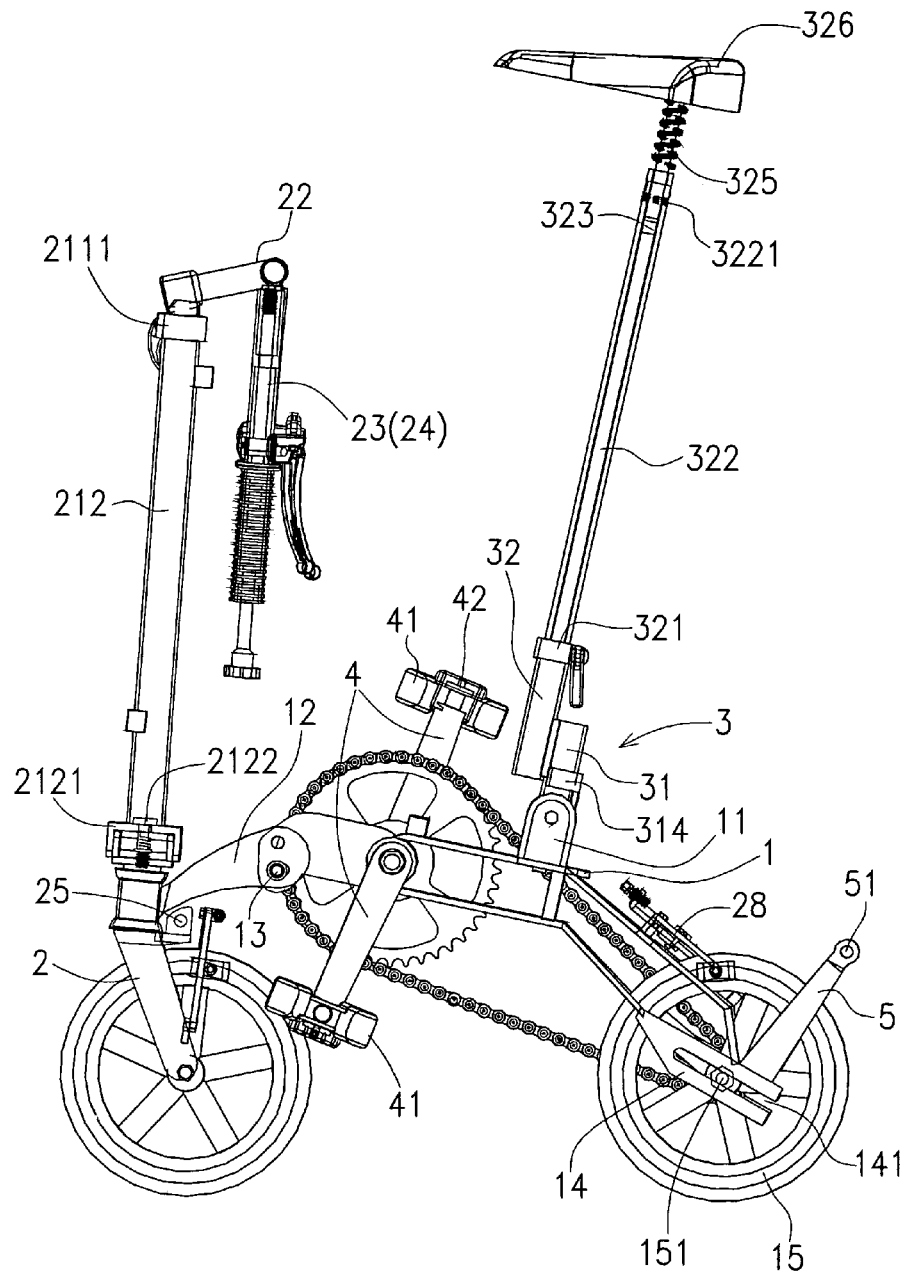
FIG. 5 is a schematic drawing of the folding collapsible bicycle according to the present invention, showing the handlebars collapsed.
Figure 6:
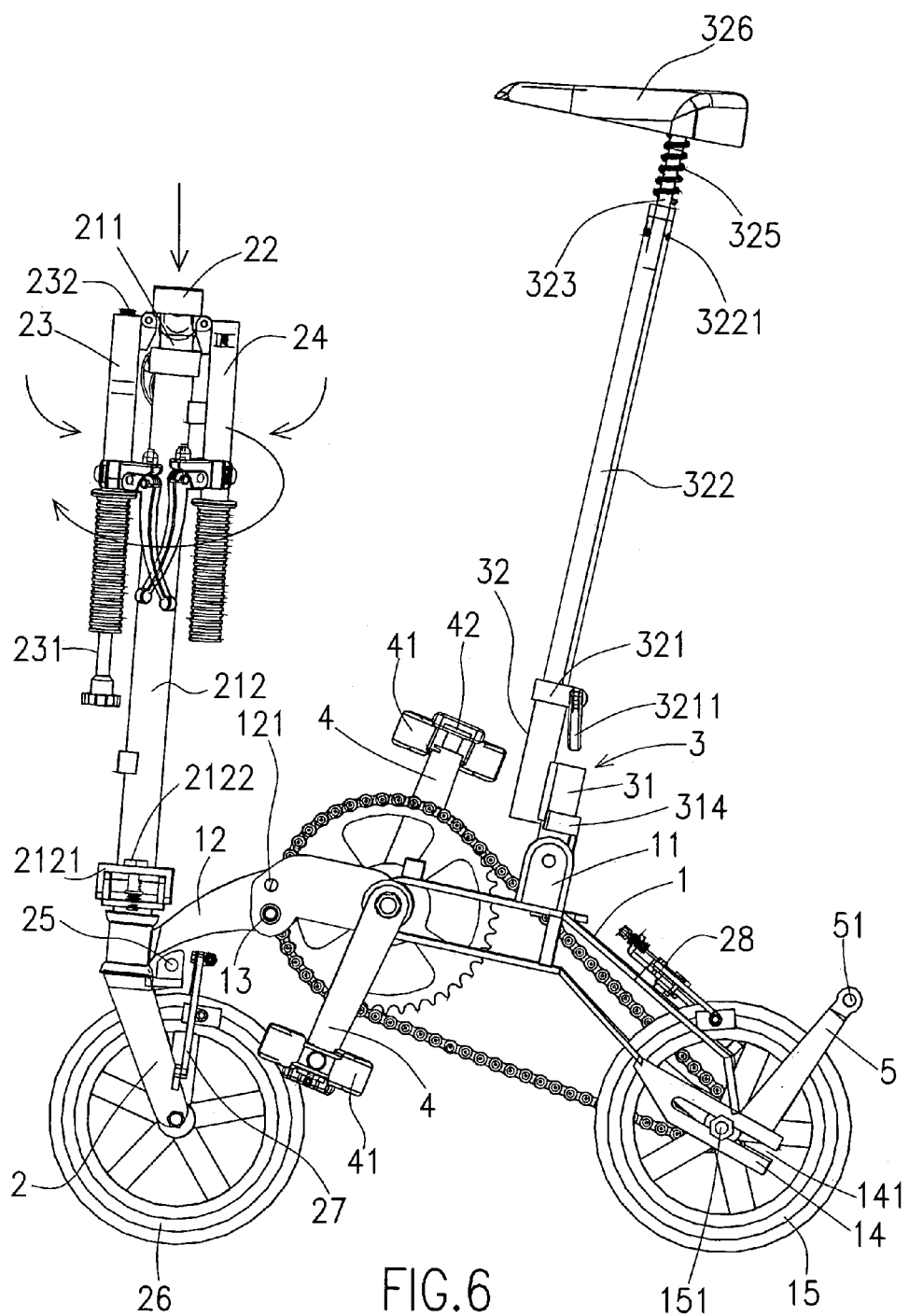
FIG. 6 corresponds to FIG. 5, showing the handlebars and the retractable fork tube rotated with the front fork through n180-degrees.
Figure 10:
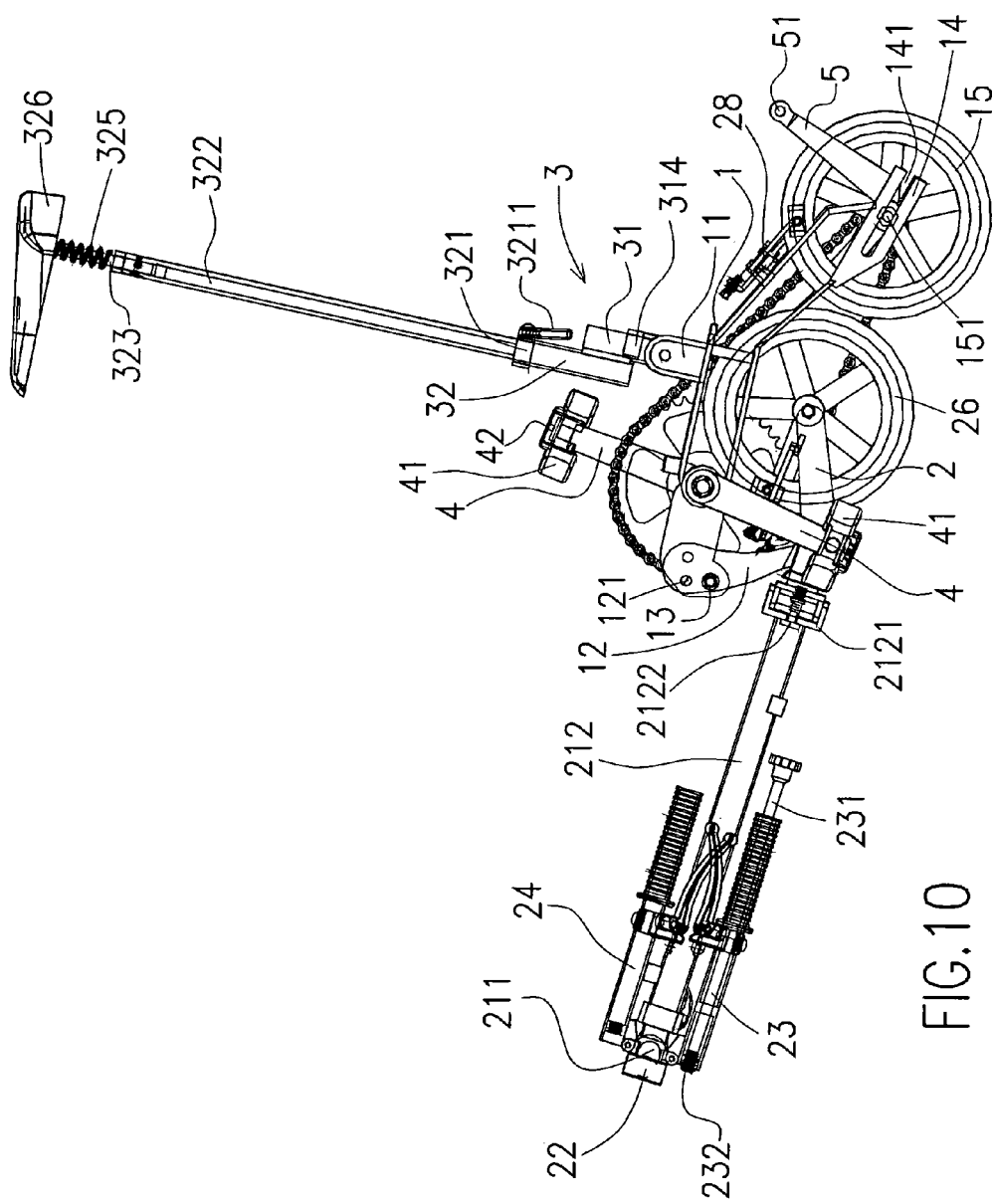
FIG. 10 corresponds to FIG. 6, showing the front fork with the front wheel, the retractable front fork tube and the handlebars turned downwards relative to the bicycle frame.
Figure 11A:
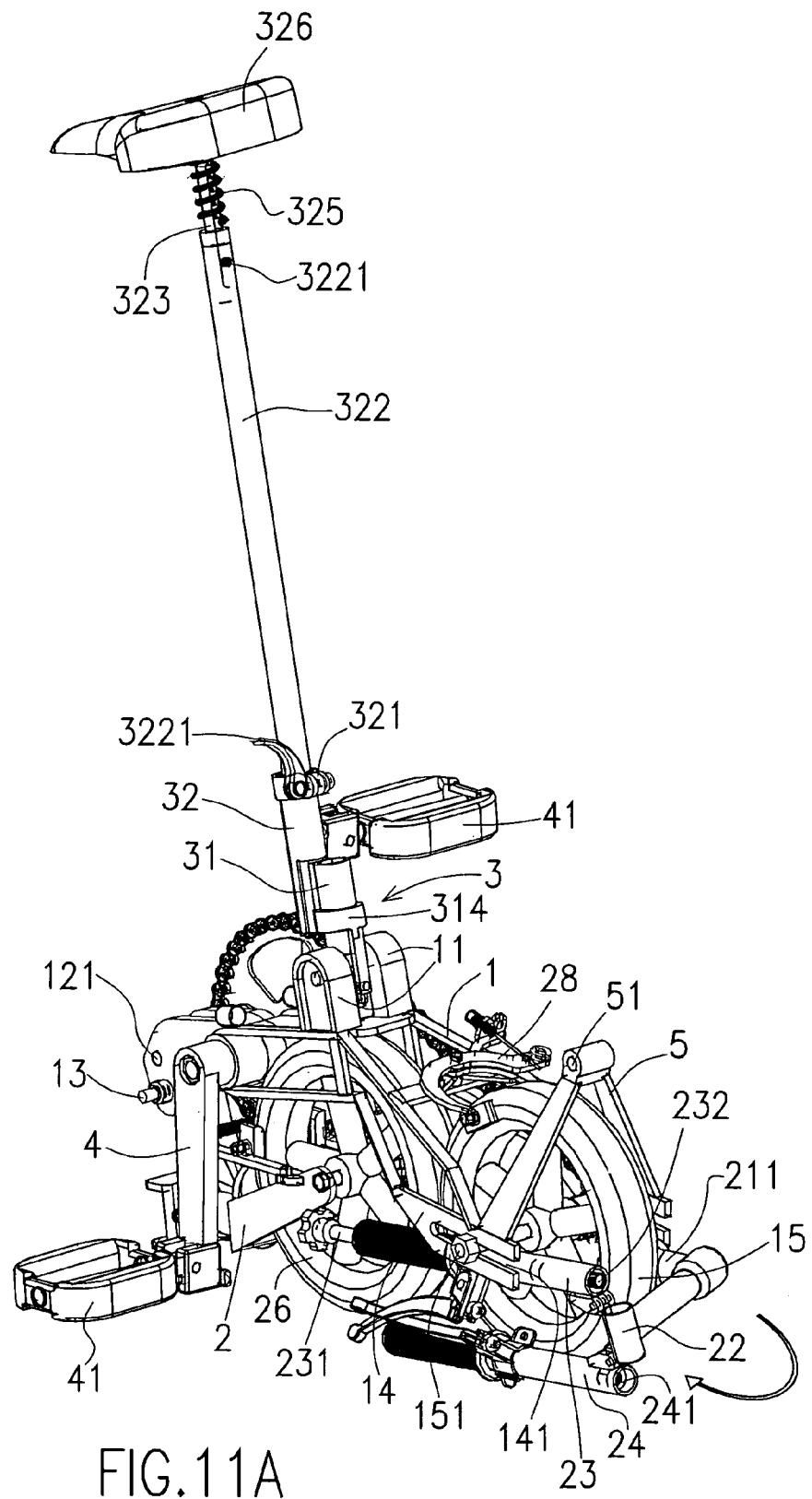
FIG. 11A corresponds to FIG. 10, showing the retractable fork tube and handlebars received with the front fork and the front wheel to the bottom side of the bicycle frame.
Figure 11D:
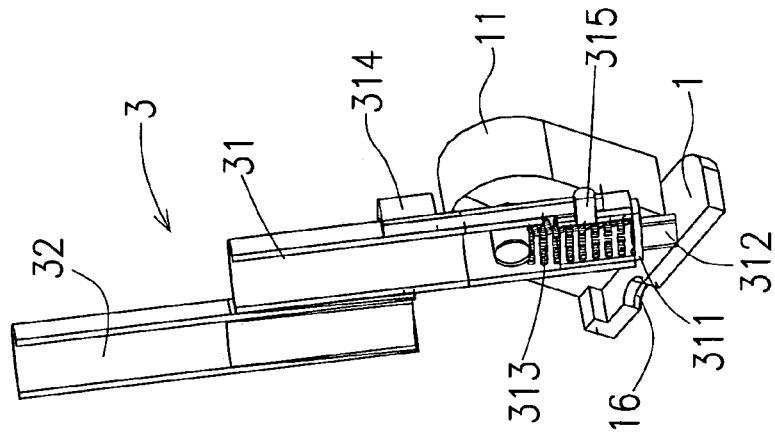
FIG. 11D corresponds to FIG. 11C, showing the seat pillar holder tilted relative to the support at the bicycle frame.
Figure 11C:
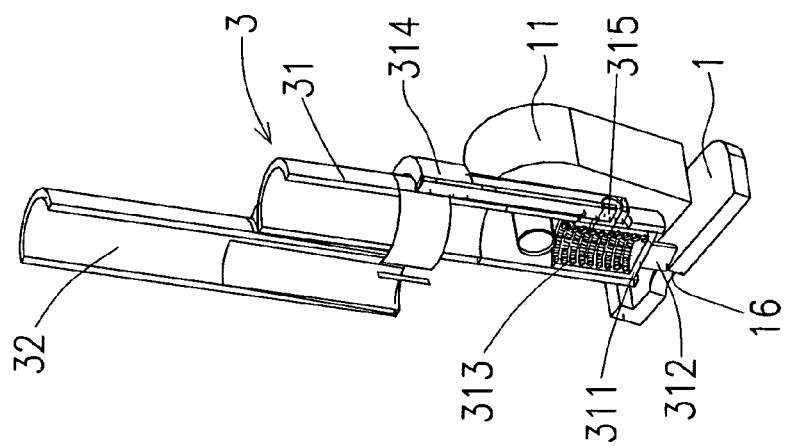
FIG. 11C corresponds to FIG. 11B, showing the lock pin disengaged from the lock hole.
Figure 11B:
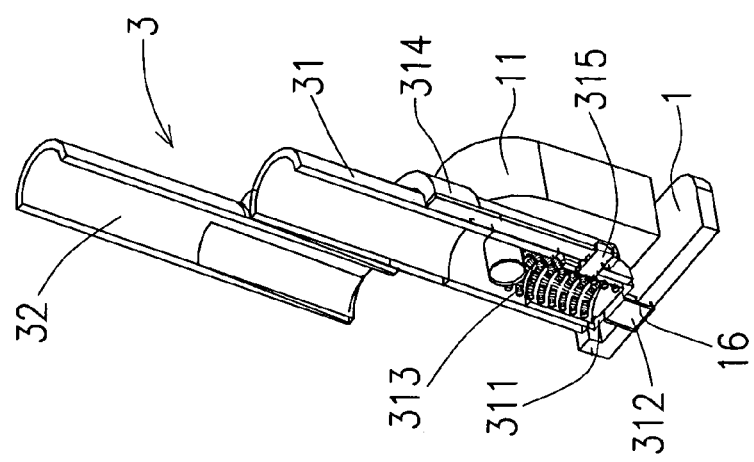
FIG. 11B is a schematic drawing showing the seat pillar holder locked to the support at the bicycle frame according to the present invention.
Figure 12:
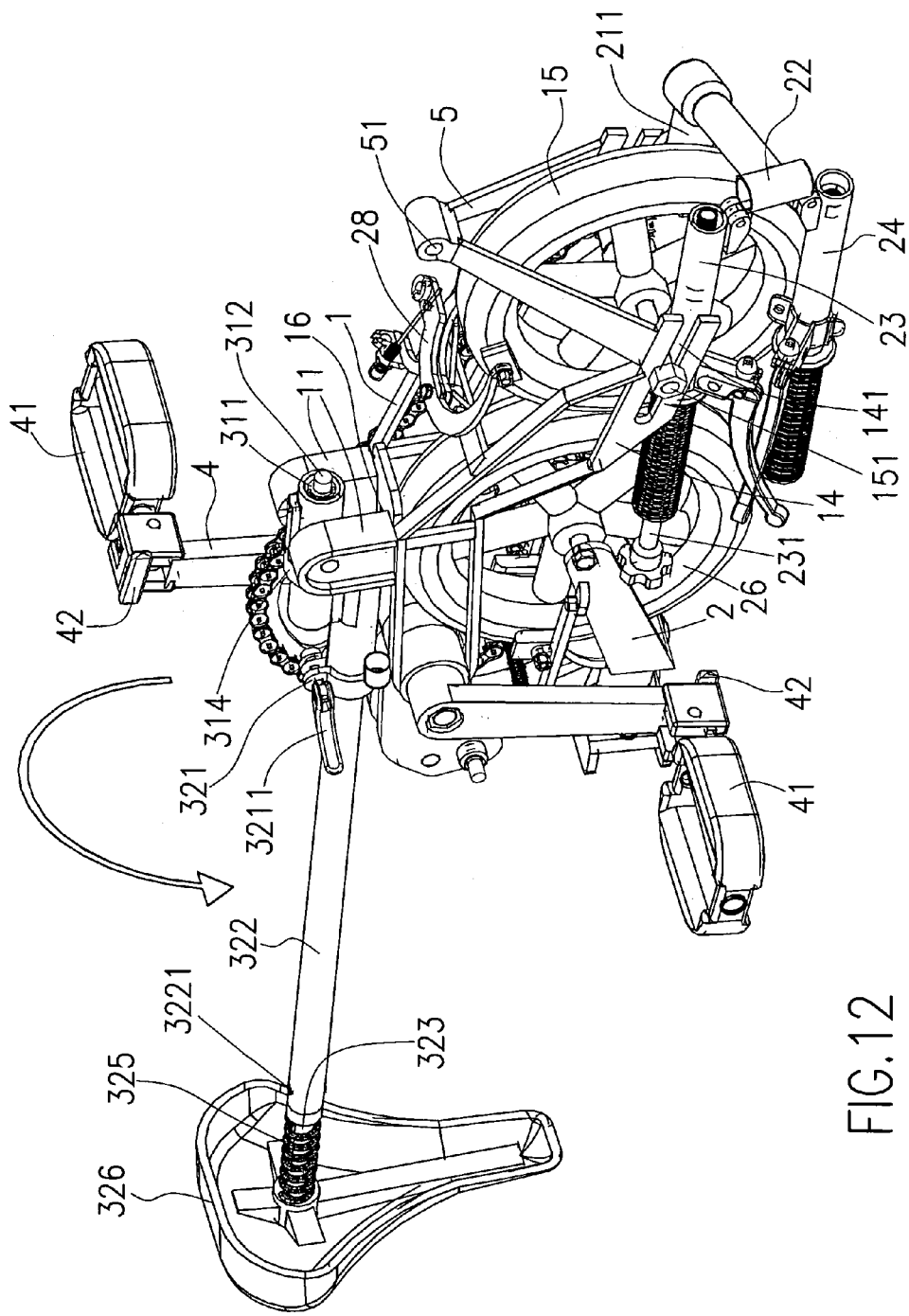
FIG. 12 is a schematic drawing of the folding collapsible bicycle, showing the seat pillar turned downwards with the seat pillar holder to a horizontal position.
Figure 13:
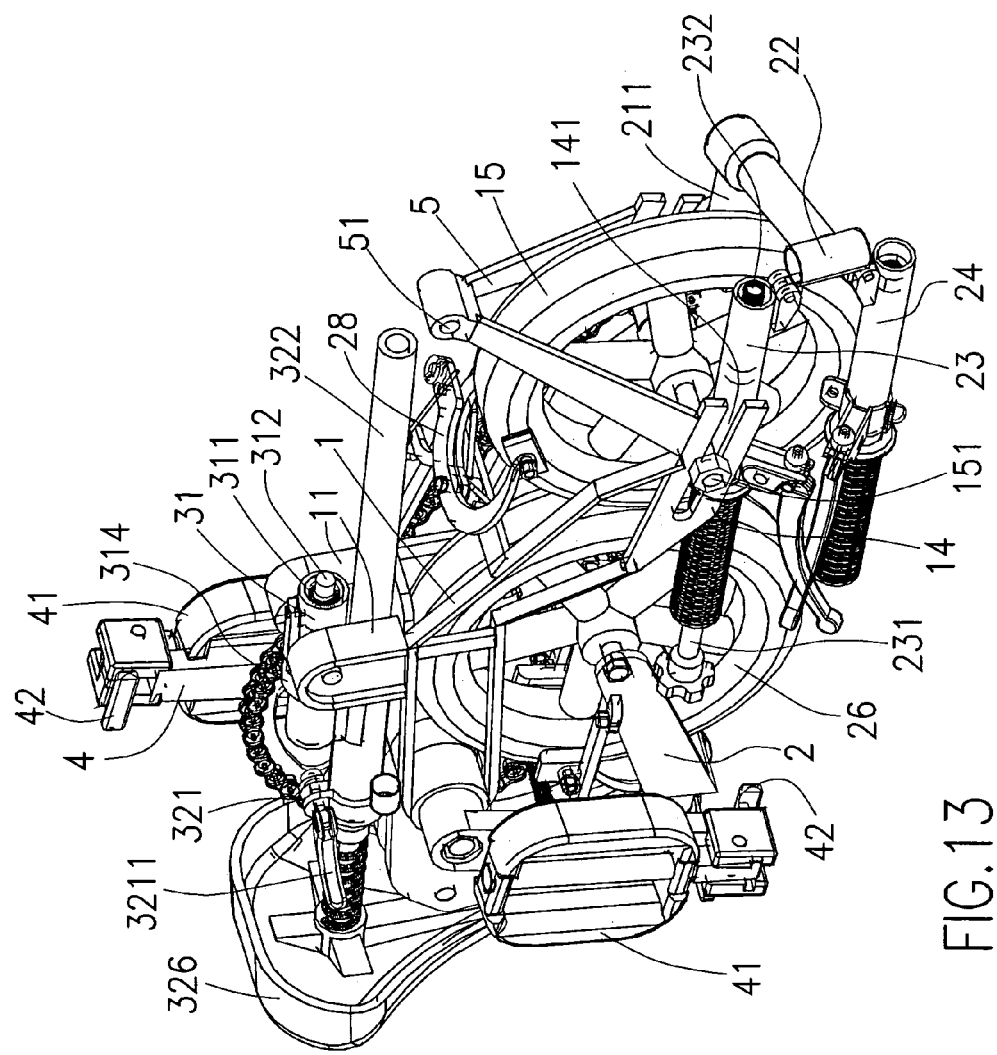
FIG. 13 corresponds to FIG. 12, showing the seat pillar received to the bicycle frame.

When wishing to collapse the folding collapsible bicycle, rotate the retractable fork tube 21 and the front fork 2 through 180-degrees as shown in FIG. 2, and then disengage the lock screw 231 from the handlebar 24, and then turn the handlebars 23, 24 downwards from the horizontal position to the vertical position as shown in FIGS. 3 and 4, and then unlock the clamp 2111 and receive the extension tube 211 in the sleeve 212 as shown in FIG. 5, and then turn the received handlebars 23, 24 with the extension tube 211 through an angle relative to the sleeve 212 as shown in FIG. 6, and then operate the button 13 to unlock the front connecting bar 12 from the bicycle frame 1 (see FIGS. 8 and 9), and then turn the front fork 2 downwards to have the front wheel 26 be received in the bicycle frame 1 as shown in FIG. 10, and then loosen the lock screw 2122 to unlock the hinge 2121, and then the collapsed retractable fork tube 21 is turned relative to the front fork 2 through 180-degrees and received with the handlebars 23, 24 to the bottom side of the bicycle frame 1 as shown in FIG. 11A, and then pull the handle 314 to disengage the lock bolt 311 from the lock hole 16 and to unlock the seat pillar holder 3 from the support 11 as shown in FIGS. 11B~11D, and then turn the seat pillar 322 with the seat pillar holder 3 downwardly forwards relative to the support 11 to a horizontal status as shown in FIG. 12, and then operate the locking lever 3211 to unlock the clamp 321 and then adjust the position of the seat pillar 322 relative to the socket 32 and then lock the clamp 321 again after adjustment as shown in FIG. 13.

Figure 14C:
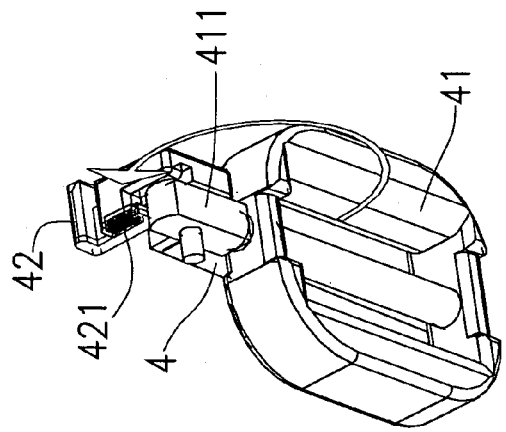
FIG. 14C corresponds to FIG. 14B, showing the pedal received to the pedal crank.
Figure 14B:
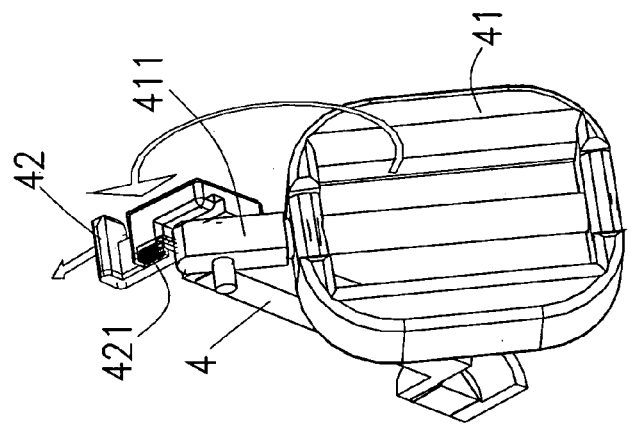
FIG. 14B corresponds to FIG. 14A, showing the pedal unlocked from the pedal crank.
Figure 14A:
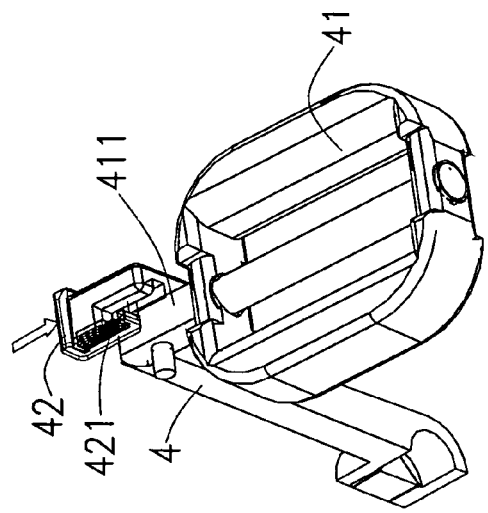
FIG. 14A is a schematic drawing, showing the pedal locked to the pedal crank according to the present invention.

Further, the pedal cranks 4 are respectively connected to the two distal ends of the bottom bracket bearing axle (not shown) at the bicycled frame 1. The pedals 41 are respectively coupled to the pedal cranks 4. As shown in FIGS. 14A~14C, each pedal 41 has an axle 411 pivotally connected to the respective pedal crank 4, and locked by a locking member 42, which is supported on a spring member 421 and forced by the spring member 421 to lock the respective pedal 41 to the respective pedal crank 4. When pulling the locking member 42, outwards to unlock the respective pedal 41, the respective pedal 41 can then be turned within 90-degrees relative to the respective pedal crank 4 between the operative position shown in FIG. 14A and the non-operative (received) position shown in FIG. 13 and FIG. 14C.

Figure 15B:
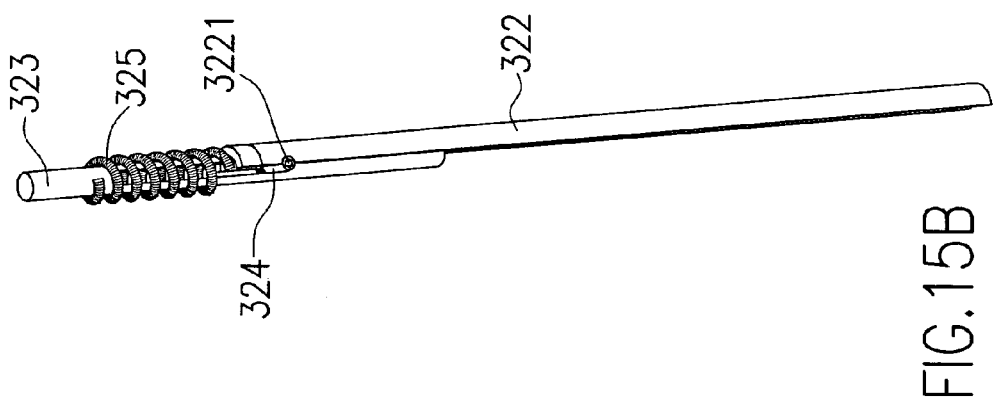
FIG. 15B is a sectional elevation of FIG. 15A.
Figure 15A:
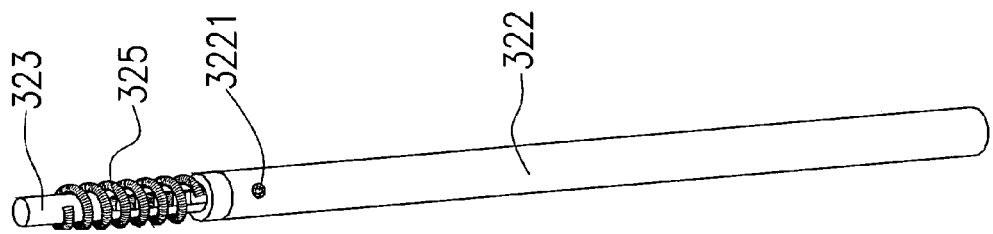
FIG. 15A is an elevational view showing the structure of the seat pillar according to the present invention.

Referring to FIGS. 15A and 15B and FIG. 1 again, a saddle 326 is provided having a bottom saddle stem 323 inserted into the seat pillar 322 and axially movable relative to the seat pillar 322. A pin 3221 is transversely fastened to the seat pillar 322 and inserted through a longitudinal sliding slot 324 on the saddle stem 323 to guide movement of the saddle stem 323 relative to the seat pillar 322 and to limit the moving distance of the saddle stem 323. Further, a shock-absorbing spring 325 is sleeved onto the saddle stem 323 and stopped between the top end of the seat pillar 322 and the bottom side of the saddle 326 to support the saddle 326 on the seat pillar 322.

Figure 16:
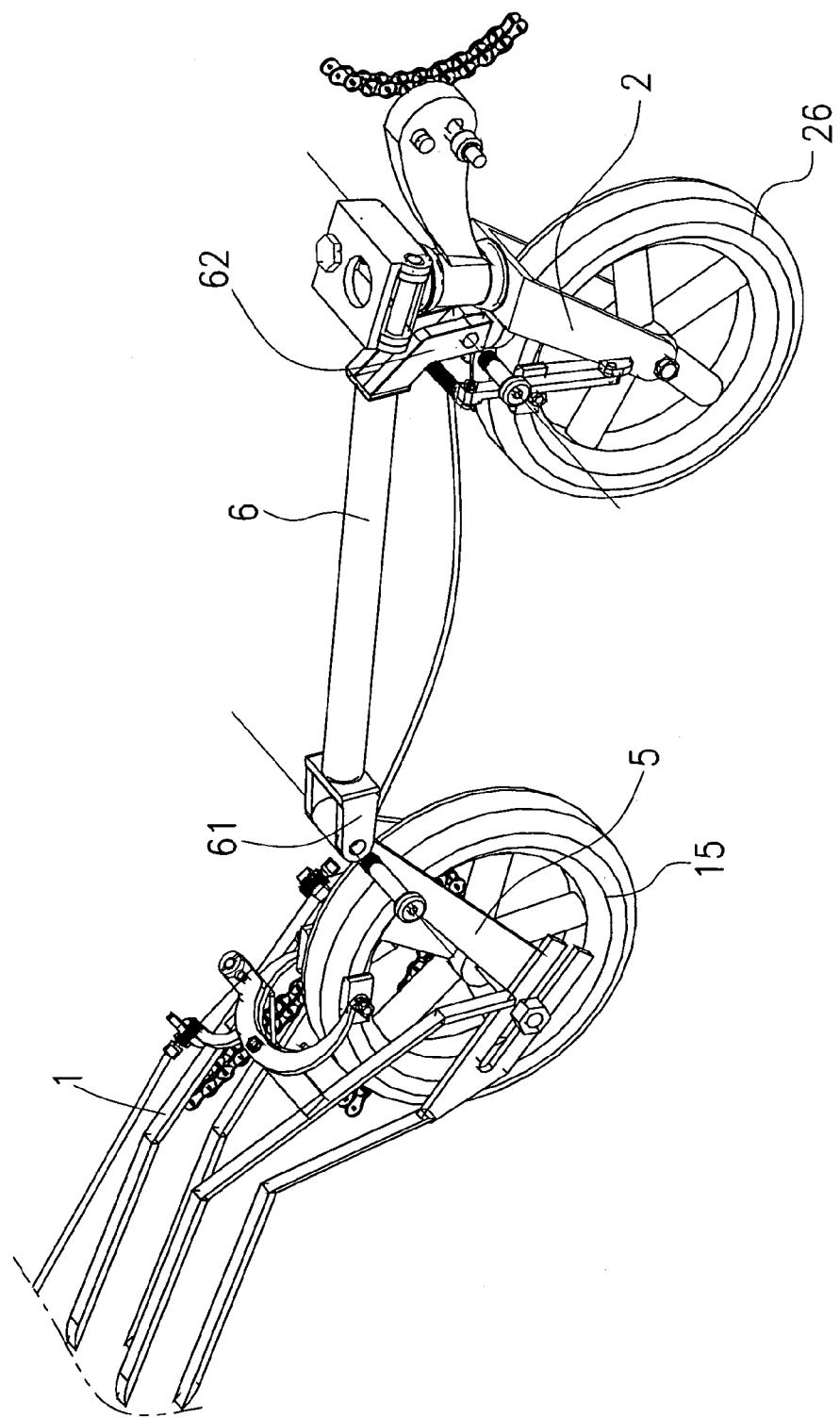
FIG. 16 is a schematic drawing showing a connecting bar connected between two folding collapsible bicycles according to the present invention.
Figure 17:
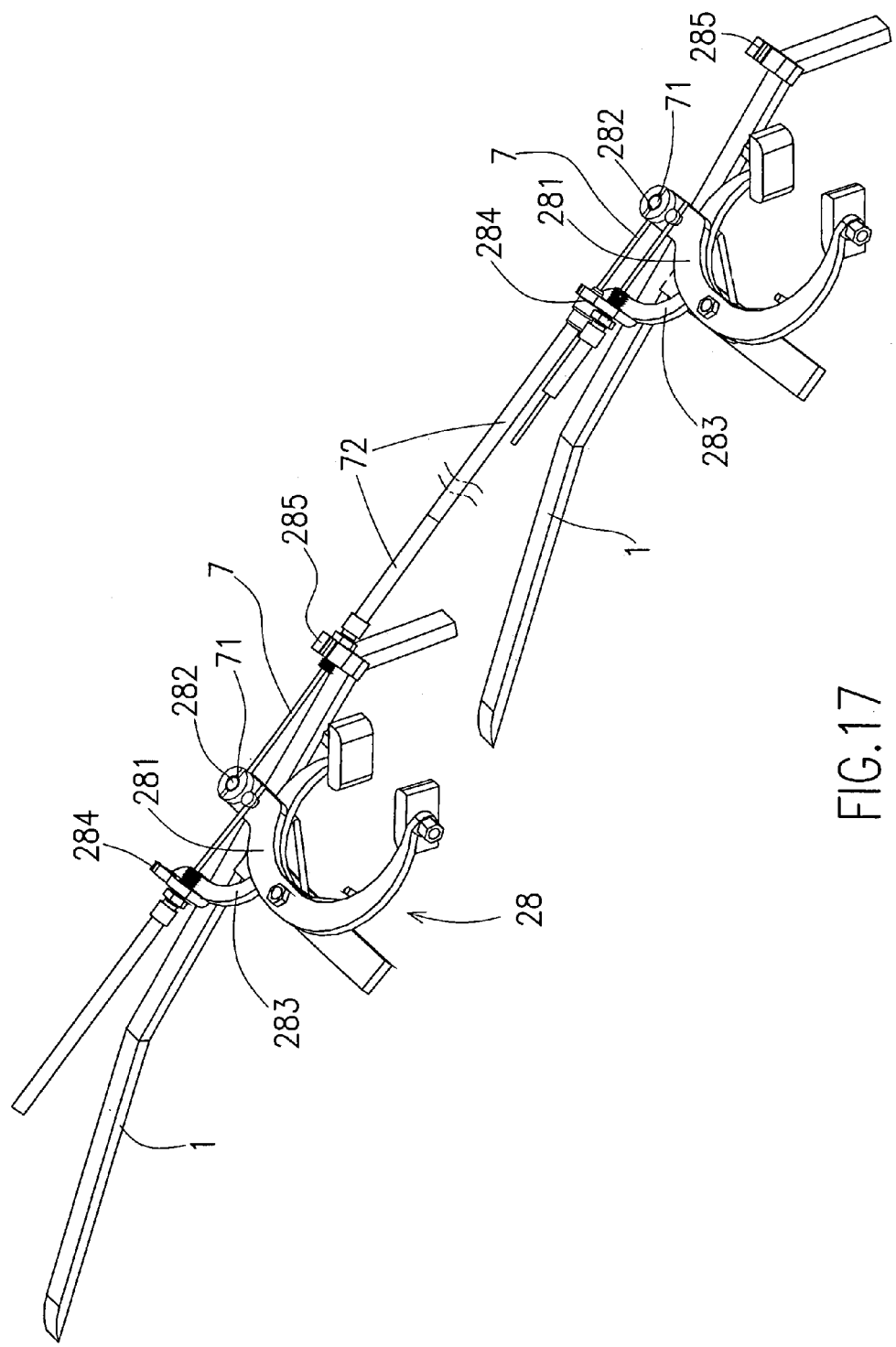
FIG. 17 is a schematic drawing showing a brake cable connected between the rear brakes of two folding collapsible bicycles according to the present invention.
Figure 18:
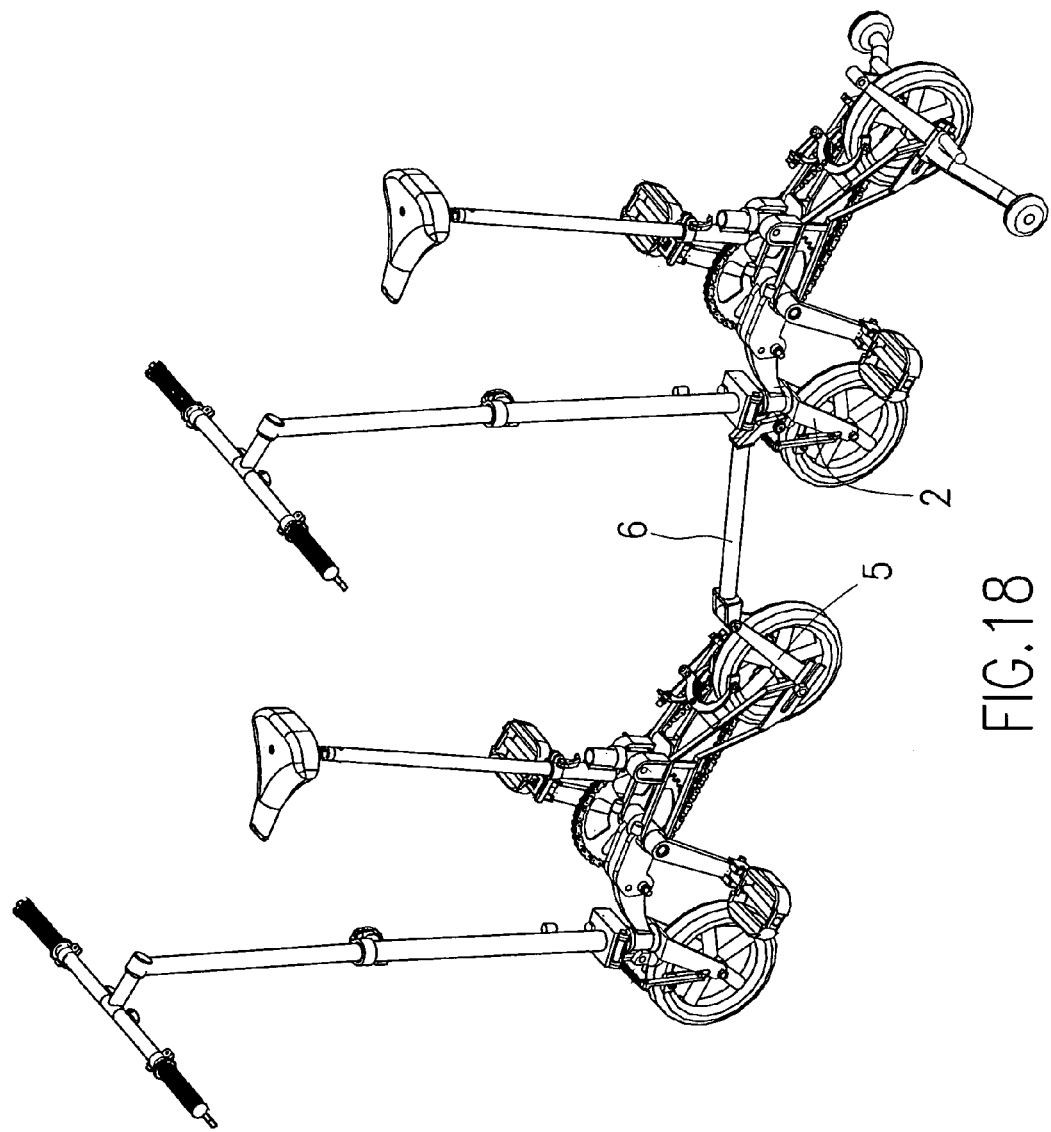
FIG. 18 shows two folding collapsible bicycles connected in series according to the present invention.

Referring to FIGS. 16 and 17 and FIG. 1 again, a front mounting hole 25 and a rear bracket 5 are respectively provided at the front fork 2 and rear side of the bicycle frame 1 near the rear wheel 15. The rear bracket 5 has a mounting hole 51. A connecting bar 6 may be used to connect two folding collapsible bicycles in a series, thereby forming a tandem (see FIG. 18). The connecting bar 6 has front lug 61 and a rear lug 62 at the ends. As shown in FIGS. 1 and 16, the front lug 61 is fastened to the mounting hole 51 of the rear bracket 5 of a first folding collapsible bicycle, and the rear lug 62 is fastened to the front mounting hole 25 on the front fork 2 of a second folding collapsible bicycle.

Referring to FIGS. 1, 17 and 18 again, the folding collapsible bicycle further comprises a front brake 27 and a rear brake 28. The rear brake 28 is mounted on a brake holder 283 at the bicycle frame 1. The brake arm 281 of the rear brake 28 has a mounting hole 282. The brake holder 283 has front and rear connectors 284, 285. When two folding collapsible bicycles are connected together by a connecting bar 6 to form a tandem, a brake cable 7 is connected between the brake arms 281 of the rear brakes 28 of the two folding collapsible bicycles in such a manner that the two distal ends of the internal metal cable 71 of the brake cable 7 are respectively fastened to the mounting holes 282 of the brake arms 281 of the rear brakes 28 of the two folding collapsible bicycle, and the two distal ends of the outer protective sleeve 72 of the brake cable 7 are respectively connected to the connectors 284, 285 of the brake holders 283 of the two folding collapsible bicycles.

Figure 19:
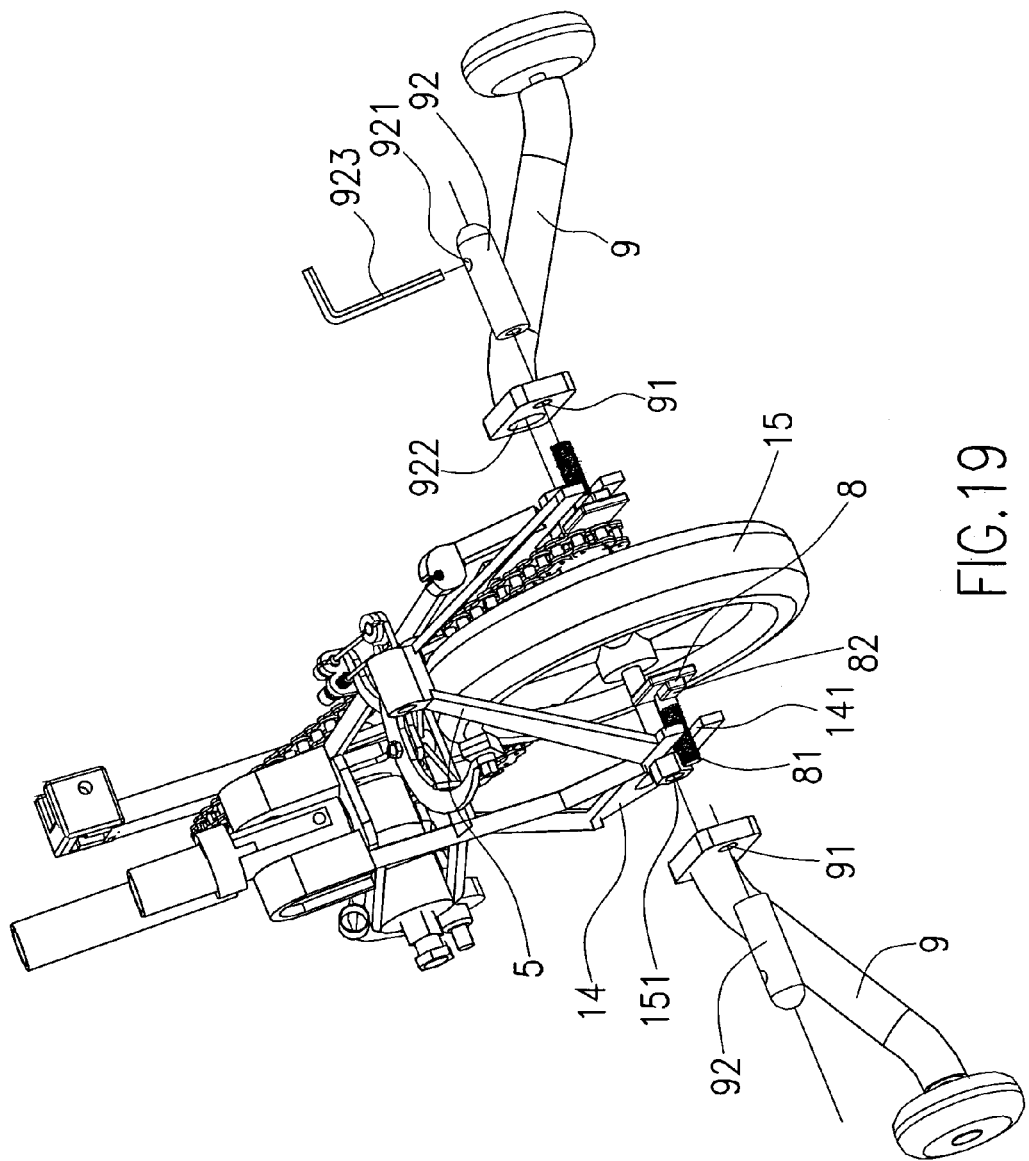
FIG. 19 is an exploded view showing the mounting arrangement of supplementary wheel assemblies on the supplementary wheel holder at the chain stays according to the present invention.

Referring to FIG. 19, a supplementary wheel bracket 8 is mounted on the chain stays 14 of the folding collapsible bicycle, having a locating block 82 for positioning and a screw rod 81 transversely mounted in the locating block 82 and inserted through the rear end notches 141 of the two chain stays 14 of the folding collapsible bicycle. Two supplementary wheel assemblies 9 are respectively fastened to the supplementary wheel bracket 8 at two sides. Each supplementary wheel assembly 9 has a mounting block 91 coupled to one end of the screw rod 81 and affixed thereto with a cap nut 92. The cap nut 92 has a tool hole 921 for receiving a hex wrench 923 that is used to rotate the cap nut 92. The mounting block 91 has a through hole 922 for accommodating the lock nut 151 of the rear wheel 15.

A prototype of folding collapsible bicycle has been constructed with the features of FIGS. 1~19. The folding collapsible bicycle functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

The invention claimed is:

1. A folding collapsible bicycle comprising
   a bicycle frame, said bicycle frame having a support at a top side thereof, a lock hole near said support, and a rear wheel pivotally mounted on a rear side thereof;
   a front connecting bar, said front connecting bar having a vertically extending tubular front end, and a rear end pivotally connected to a front side of said bicycle frame with a pivot;
   a front connecting bar locking structure for locking said front connecting bar to said bicycle frame, said front connecting bar locking structure comprising a lock hole formed on the rear end of said front connecting bar, a spring member mounted on said bicycle frame, a lock pin supported on the spring member and forced by the spring member into the lock hole on said front connecting bar to lock said front connecting bar to said bicycle frame, a push pin mounted on said bicycle frame corresponding to the lock pin, and a button for operation by the user to force said push pin against said lock pin and to further disengage said lock pin from said lock hole;
   a front fork coupled to said vertically extending tubular front end of said front connecting bar and holding a pivoted front wheel;
   a retractable fork tube, said retractable fork tube comprising a sleeve and an extension tube axially movable in and out of said sleeve, said sleeve having a bottom end connected to said front fork by a hinge and locked by a lock screw and a top end provided with a clamp adapted to lock said extension tube and a locking lever for driving said clamp to lock/unlock said extension tube, said extension tube having a handlebar stem at a top end thereof;
   a first handlebar and a second handlebar respectively hinged to said handlebar stem at two sides and turnable relative to said extension tube between an operative horizontal position and a non-operative vertical position, said second handlebar having a screw hole at one end, said first handlebar having a lock screw mounted therein for threading into the screw hole of said second handlebar to said second handlebar to said first handlebar;
   a seat pillar supported on said support of said bicycle frame to hold a saddle;
   a seat pillar holder mounted on said support of said bicycle frame, said seat pillar comprising a socket, which receives said seat pillar, a connecting tube fixedly provided at one side of said socket and pivotally connected to said support, a spring member mounted inside said connecting tube, a lock bolt supported on the spring member of said seat pillar holder and engaged into the lock hole on said bicycle frame to lock said seat pillar holder to said support, a connecting pin transversely connected to said lock bolt and inserted through a longitudinal sliding slot on said connecting tube, and a handle connected to said connecting pin for pulling by the user to move said lock bolt out of the lock hole of said bicycle frame and to further unlock said seat pillar holder from said support.

2. The folding collapsible bicycle as claimed in claim 1, wherein said bicycle frame comprises two pedal cranks on two ends of a bottom bracket bearing axle thereof and two pedals respectively coupled to said pedal cranks, said pedals each having an axle pivotally connected to the respective pedal crank and locked by a respective locking member, which is supported on a spring member and forced by the spring member to lock the respective pedal to the respective pedal crank.

3. The folding collapsible bicycle as claimed in claim 1, wherein said saddle having a bottom saddle stem inserted into said seat pillar and axially movably coupled to said seat pillar by a slip joint, and a shock-absorbing spring is sleeved onto said saddle stem and stopped between a top end of said seat pillar and a bottom side of said saddle to support said saddle on said seat pillar.

4. The folding collapsible bicycle as claimed in claim 1, wherein said front fork has a front mounting hole and said bicycle has a rear bracket such that a connecting bar can be connected between the front mounting hole on the front fork of a first folding collapsible bicycle and the rear bracket of a second folding collapsible bicycle to connect the two folding collapsible bicycles in series and to form a tandem.

5. The folding collapsible bicycle as claimed in claim 1, wherein said bicycle frame comprises a brake holder and a rear brake mounted on said brake holder for stopping said rear wheel, said rear brake having a mounting hole on a brake arm thereof for the connection of a brake cable for enabling the rear brakes of two folding collapsible bicycles that are connected in series with a connecting bar to be synchronously operated.

6. The folding collapsible bicycle as claimed in claim 1, wherein said bicycle frame comprises a supplementary wheel bracket mounted on two chain stays thereof to support a screw rod, and two supplementary wheel assemblies are respectively fastened to said screw rods at two sides of said bicycle frame with a respective cap nut.

7. The folding collapsible bicycle as claimed in claim 6, wherein said cap nut has a tool hole for receiving a hex wrench.

* * * * *